Aug. 15, 1961     G. K. ANDREW     2,996,227
FISHERMAN'S BELT
Filed June 27, 1958
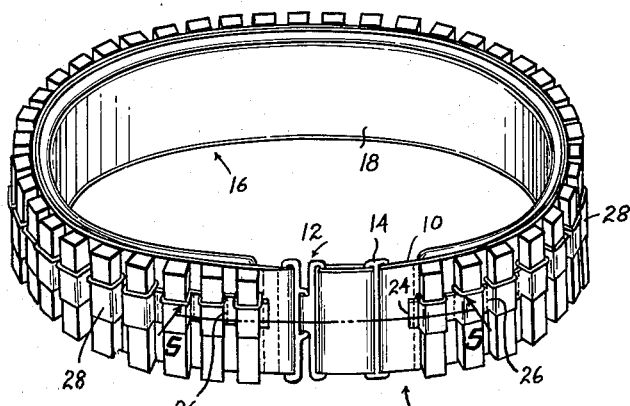
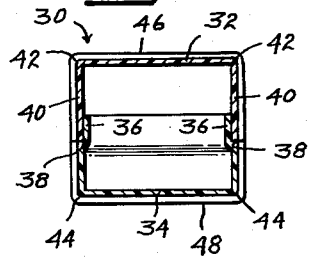
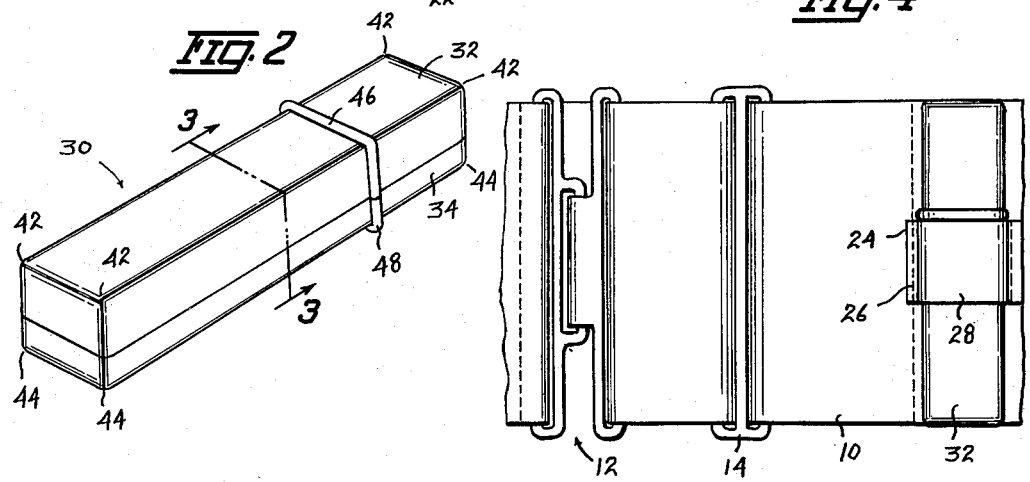
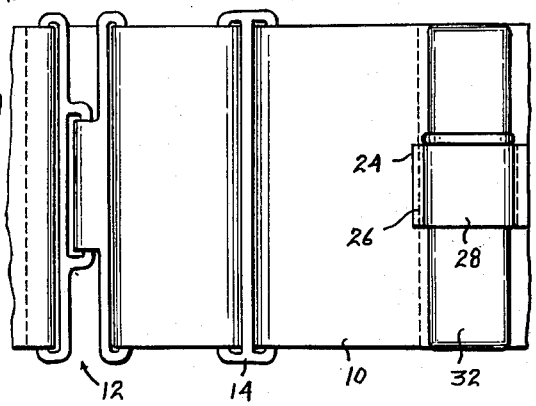
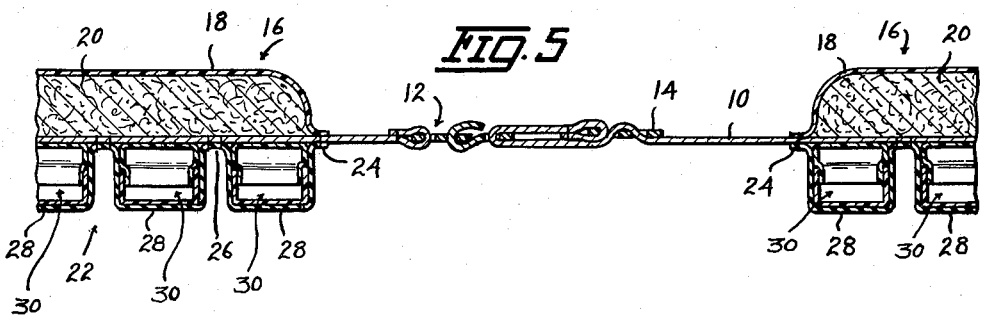
INVENTOR.
GIFFIN K. ANDREW
BY *Morton S. Adler*
ATTORNEY.

United States Patent Office 2,996,227
Patented Aug. 15, 1961

2,996,227
FISHERMAN'S BELT
Giffin K. Andrew, Grand River, Iowa
Filed June 27, 1958, Ser. No. 745,028
2 Claims. (Cl. 224—5)

My invention relates to paraphernalia for a fisherman and more particularly to a belt for holding a variety of accessories used in the sport of fishing and to be worn about the waist.

Most all fishermen include a tackle box in their complement of fishing gear to hold a varied assortment of lures, lines, etc., according to their particular taste and desires, and few are the fishermen who have not at some time or other experienced the nuisance of accidentally tipping over their tackle box on a shore or in a boat and spilling the contents which under some circumstances may be irretrievably lost. In other situations the convenience of a tackle box for carrying a supply of fishing accessories may be considerably offset by the necessity for toting it from place to place as the fisherman changes locations or by having to return periodically to get it if left behind. It has also been observed that not infrequently a fisherman will require only a few lures, for example, for certain phases of the sport and these are sometimes placed in pockets to eliminate carrying a tackle box where they are susceptible to becoming easily lost or to tearing the user's clothing.

With such observations in mind, this invention contemplates the provision of a belt having means to securely and conveniently contain a relatively large number of fishing accessory items which a fisherman might select.

More particularly it is an object of this invention to provide a belt of the above class having a plurality of loops of elastic material for removably supporting an elongated light transparent container of plastic or the like into which the fisherman can place a variety of fishing accessories or other items for his personal convenience.

A further object inhering herein is the provision of a fisherman's belt of the character indicated having incorporated therein material which is sufficiently buoyant so as to serve the purpose of a life belt or life preserver for the wearer if the situation requires.

Another object includes the use of sufficient water tight containers as described to provide additional water displacement means for enhancing the efficiency of the belt as a life preserver. In this respect it is a further object to construct the containers in such a way that the elastic loops will serve not only to support such containers but to yieldingly hold the cap or top of the containers in tight engagement with the bottom or body portion thereof.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

FIG. 1 is a perspective view showing a preferred embodiment of this invention,

FIG. 2 is an enlarged perspective view of one of the accessory containers used with this belt.

FIG. 3 is a cross sectional view taken on the line 3—3 of FIG. 2,

FIG. 4 is an enlarged elevational view showing a fragmentary portion of this belt and the buckle means therefor, and, FIG. 5 is a sectional view taken on the line 5—5 of FIG. 1.

Referring to the drawings a relatively wide belt 10 which I prefer to be approximately five inches in width is provided with a suitable buckle means 12 and includes a keeper 14 attached to one end of the belt 10 as shown in FIG. 1, and which is slidable on belt 10 to afford a lengthwise adjustment of the belt in a well known manner. On the inner side 16 of belt 10 a closed or sealed pocket or compartment formed by covering 18 is co-extensive with the belt except for the buckle area and is filled with any suitable material 20 of the type used to provide buoyancy in life belts, life jackets and the like.

On the outer side 22 of belt 10 and extending longitudinally thereon in preferably the center portion throughout its length except for the buckle area is a band 24 of elastic material stitched as at 26 at regular spaced intervals to the belt 10 to provide a plurality of spaced loops 28 circumscribing the belt as shown in FIG. 1. A transparent box 30 preferably of plastic or the like is designed to be slipped into and out of each loop 28 so as to be frictionally held and supported therein at times as shown in FIG. 1. Each box 30 is elongated in shape, is preferably substantially square or rectangular in cross section and includes a top 32 and bottom portion 34. The top portions 36 of the longitudinal sides of bottom 34 (FIG. 3) are slightly off set towards each other to form the shoulders 38 whereby the lower portions 40 of the sides on top 32 overlap portions 36 and rest on shoulders 38. All outside corners 42 on top 32 and like corners 44 on bottom 34 are preferably rounded to facilitate their insertion into loops 28. Near one end portion of top 32 there is integrally formed or otherwise attached a raised bead or rib 46 extending transversely of the longitudinal axis thereof on the sides and top and a complementary bead or rib 48 is similarly placed on bottom 34 on the sides and bottom thereof so that when the box 30 is closed, beads 46 and 48 form a continuous raised rib or lip extending all around one end portion of such box. Box or container 30 thus formed has a cross sectional dimension sufficient to afford a snug fit into loop 28 and when inserting such box into the loop, the lip formed by beads 46 and 48 is placed at the top relative to the position in which belt 10 will be worn (FIG. 1) so that such lip engages the top of the loop 28 to serve as a stop means against slippage of the box 30 downwardly from the loop. For this purpose beads 46 and 48 are designed to increase the width of box 10 sufficiently at this point so to be normally incapable of passing through loop 28. While it will be understood that belt 10 can be varied in length or size and that loops 28 and boxes 30 may be of any desired dimension, I have found that boxes five inches long, one inch deep and one and one quarter inches wide will serve the purposes for which this belt is designed very satisfactorily.

In using this belt it will be fastened around the user's waist and for convenience in putting it on the buckle 12 may initially be placed in the front. Once on, however, it is recommended that the belt be rotated to place the buckle at the rear whereby the greater number of boxes 30 will be easily accessible. Boxes 30 may be used for plugs, flies and other lures and also for any other accessories which suit the fancy of the user. In this way, the fisherman can conveniently carry on his person an adequate supply of fishing needs and thereby eliminate the requirement for a separate tackle box. Another advantage of this belt resides in the fact that boxes 30 are securely held in place by the loops 28 so that danger of spilling the contents is eliminated and since all accessories are thus carried on the person, there will be no need to place a tackle box or the like in any situation where it can be accidentally dislodged or fall.

The elongated shape of boxes 30 with the complementary halves 32 and 34 is designed so that pressure from loops 28 in addition to holding such boxes on the belt also yieldingly press the box sections 32 and 34 into tight engagement with each other to make each box essentially a watertight container. Thus the plurality of boxes 30 and material 20 complement each other in providing buoyancy to belt 10 so that it will function as a life preserver belt if required should the user fall from a boat or slip while fishing from a wading position.

It is submitted that the invention shown and decribed is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A fisherman's belt, comprising an elongated belt, buckle means for detachably securing the belt ends together, a plurality of spaced elastic loops disposed on one side of said belt, a plurality of elongated boxes consisting of lengthwise arranged complementary halve portions, each of said boxes longitudinally slidable into one of said loops for support on said belt, the resiliency of said loops adapted to press said halves into watertight engagement with each other, and respective ribs on one end portion of said box halves complementary to each other in forming a circumscribing lip engageable with said respective loops to serve as a stop means against movement of said boxes through said loops in one direction.

2. A fisherman's belt, comprising an elongated belt, buckle means for detachably securing the belt ends together, a covering on one side of said belt substantially co-extensive therewith to form a closed compartment, a solid buoyant material sealed within said compartment, a plurality of spaced elastic loops on the other side of said belt, a plurality of containers each consisting of complementary halves adapted to register in water tight engagement, said containers removably supported on said belt by said respective loops whereby the buoyancy of said belt is increased, and said loops also serving as means for securing said container halves against accidental separation.

References Cited in the file of this patent

UNITED STATES PATENTS

| 946,539 | Drexler | Jan. 18, 1910 |
| 1,085,451 | Lynch | Jan. 27, 1914 |
| 2,081,930 | Hoffman | June 1, 1937 |
| 2,606,708 | Irvan | Aug. 12, 1952 |
| 2,751,611 | Mann | June 26, 1956 |
| 2,802,222 | Chapman | Aug. 13, 1957 |
| 2,817,472 | Parkhurst | Dec. 24, 1957 |

FOREIGN PATENTS

| 300,428 | Great Britain | Nov. 15, 1928 |